United States Patent Office 3,291,746
Patented Dec. 13, 1966

---

3,291,746
METAL PHTHALOCYANINES AS INFRARED ABSORBERS
Haig Cadmus Donoian, South Lowell, Mass., and John Mark Dowd, Jr., Hillsboro Township, Somerset County, N.J., assignors to American Cyanamid Company, Stamford, Conn., a corporation of Maine
No Drawing. Filed Aug. 26, 1963, Ser. No. 304,626
2 Claims. (Cl. 252—300)

This invention relates to novel infrared absorbers and to their use in substrates for absorbing infrared radiation. More particularly, it relates to certain metal phthalocyanines to their use in optical filter systems for filtering out infrared radiation; and to transparent organic plastic substrates containing said phthalocyanines.

Still more specifically, the invention is concerned with metal phthalocyanines of the formula

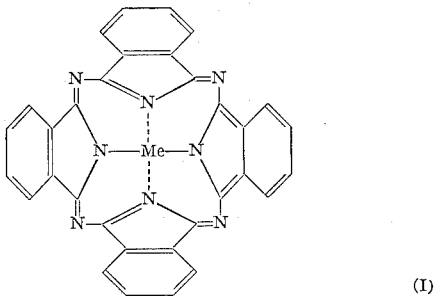

(I)

where Me is $Ge(OH)_2$ or VO; i.e., dihydroxygermanium and vanadyl phthalocyanines.

Radiant energy from the sun is frequently grouped into three regions, the near-ultraviolet, the visible and the near-infrared. Together these three regions cover the range of wavelengths from 0.290 micron to about 5.0 microns. Somewhat arbitrarily, the near-ultraviolet spectrum may be considered to cover the region of 0.300–0.400 micron; the visible spectrum, the region of 0.400–0.700 micron; and the near-infrared spectrum the region of 0.700–5.0 microns.

Heat from the sun is essentially due to the near-infrared radiant energy. Other high temperature bodies, such as tungsten filaments, fluorescent lamps, carbon arcs, etc., also radiate energy in the near-infrared region. For practical purposes, this region often is defined as falling between 0.7 and 5.0 microns, this being the region where common sources of infrared radiation emit substantially all of their infrared energy. Over half of the total radiation energy emitted by the sun or electrical lamps lies in the near-infrared region. This is shown in the following tables.

TABLE I
[Approximate distribution of radiant energy from several energy sources]

| | Percent of Total Radiant Energy Emitted | | | |
|---|---|---|---|---|
| | .3–.4μ | .4–.7μ | .6–1.6μ | Above .7μ |
| Sunlight (reaching earth) | 5 | 42 | 54 | 53 |
| Tungsten Lamp, 500 w | 0.1 | 10 | 53 | 90 |
| Fluorescent Lamp | 5 | 35 | 28 | 60 |
| Carbon Filament Heater | | 1 | 28 | 99 |
| Nonluminous Heater | 0 | 0 | 1.3 | 100 |

TABLE II
[Approximate distribution of radiant energy of sunlight]

| Region | Percent of Total | Percent of Infrared |
|---|---|---|
| 0.3–0.4μ | 5 | |
| 0.4–0.7μ | 42 | |
| 0.7–1.0μ | 23 | 43.5 |
| 1.0–1.3μ | 12 | 22.5 |
| 1.3–1.6μ | 4.5 | 8.5 |
| 1.6–1.9μ | 4.5 | 8.5 |
| 1.9–2.7μ | 5 | 9.5 |
| 2.7–up μ | 4 | 7.5 |

These tables indicate that within the near-infrared region, the greater part of the infrared energy is radiated within the region from about 0.7 to about 2.0 microns. For example, in normal sunlight some two-thirds of the radiant energy is at wavelengths of from about 0.7 to about 1.3 microns. Accordingly, it may be seen that a large proportion of the energy transmitted by our common light sources serves no useful purpose with respect to illumination, but contributes to the development of heat in the material receiving the radiation.

It also may be noted in Table II that some 43–44% of the total infrared radiation in sunlight is in the region just above about 0.7 micron. The latter is about the upper limit of the visible range which, as noted above, usually is defined as from about 0.4 to about 0.7 micron, hence the "near" infrared designation. While by definition the near-infrared region extends only down to about 0.7 micron, for purposes of this invention the region of particular interest extends from about 0.65 micron to about 1.3 microns.

In many circumstances it is desirable to filter out non-visible radiations of the near-infrared region without materially diminishing transmission of visible radiations. There are many potential applications for materials that will transmit a major portion of the visible radiations but at the same time be at least semi-opaque to heat-producing infrared radiation, particularly that in the above-noted region of from about 0.65 to about 1.3 microns. Among such possible applications may be mentioned sunglasses, welders' goggles and other eye protective filters, windows, television filters, projection lenses and the like. In many, if not most, of such uses the primary object is to protect the human eye from the adverse effects of radiation in the near-infrared. Accordingly, for purposes of this discussion sunglasses will be taken as illustrative.

Glass of most types is substantially opaque to infrared radiation longer than about five microns. Consequently even when glass can be used, it must be modified to decrease transmission of infrared radiation at from about 0.7 to about 5.0 microns. Various additives have been developed for this purpose, the most usual being metallic oxides such as ferrous oxide. Obviously, when it is necessary or desirable to use an organic plastic substrate which transmits well in the visible region, such additives as are suitable for glass cannot be employed.

Experience has shown that sunglasses, as the illustrative example, should be capable of transmitting at least about 10% of incident visible light shorter than about 0.65 micron. However, to provide adequate protection for the human eye, transmission should be less than forty percent at from about 0.65 to about 0.75 micron and not over about ten percent between about 0.75 and about 0.95 micron. Preferably, at least 20% of visible light will be transmitted. In the two other noted ranges, preferably transmission should not exceed about five percent and one percent respectively.

Other protective optical filters may vary as to requirements in the visible range. In most cases, however, transmission in the near-infrared should not exceed the indicated limitations. This applies, for example, not only to other eye protective devices as widely different as welders' goggles and window glass, but also to protecting inanimate material as in the case of projection lenses. Optimum protective utility, therefore, ordinarily requires relatively good transmission of radiation below about 0.65 micron but reduced or minimized transmission above that value. Obviously complete cutoff at exactly this, or any other wavelength, is impossible. Nevertheless, for the purposes of this invention, cutoff should be as sharp as possible within a minimum spread of wavelength at about 0.65 micron.

Various organic plastic substrates are available having generally suitable transmission properties in the visible region. Illustrative examples include: cellulose derivatives such as cellulose nitrate, cellulose acetate and the like; regenerated cellulose and cellulose ethers as for example, ethyl and methyl cellulose; polystyrene plastics such as polystyrene per se and polymers and copolymers of various ring-substituted styrenes such for example as o-, m- and p-methylstyrene and other ring-substituted styrenes as well as side-chain substituted styrenes such as alpha-, methyl- and ethyl-styrene and various other polymerizable and copolymerizable vinylidenes; various vinyl polymers and copolymers such as polyvinyl butyral and other acetals, polyvinyl chloride, polyvinyl acetate and its hydrolysis products, polyvinyl chloride-acetate copolymers and the like; various acrylic resins such as polymers and copolymers of methyl acrylate, methyl methacrylate, acrylamide, methylolacrylamide, acrylonitrile and the like; polyolefins such as polyethylene, polypropylene and the like; polyesters and unsaturated-modified polyester resins such as those made by condensation of polycarboxylic acids with polyhydric phenols or modified using unsaturated carboxylic acid and further modified by reacting the alkyd with another monomer; polymers of allyl diglycol carbonate; and various copolymers using as a cross-linking monomer an allyl ester of various acids. Of particular interest and preferred herein as substrates are cellulose acetate, methylmethacrylate, polystyrenes and polymers of alkyl diglycol carbonates.

Any one such substrate may, and usually does, vary from the others very appreciably in its transmission of radiant energy at various wavelengths. Nevertheless, if not modified, none meet the foregoing transmission requirements. Some additive is necessary to decrease the infrared transmission without adversely affecting the transmission in the visible range.

Numerous organic compounds have been proposed for use in organic substrates for protection against radiation in the near-infrared (N.I.R.). Unfortunately, such previously-proposed agents, and even combinations thereof, did not prove wholly satisfactory for various reasons; particularly in the illustrative case of protection for the eye against incident N.I.R. radiation.

One such commonly-encountered deficiency was too low in "N.I.R. attenuation efficiency." The latter may be defined as the spread between percent transmittance ($T_2$) at the wavelength of maximum visual transmittance and the percent transmittance ($T_1$) at the wavelength of maximum N.I.R. attenuation or absorbance, i.e., ($T_2-T_1$) which for simplification of reference will be used below to designate this "attenuation efficiency." In an optical filter having good transmittance in the blue region of the visual spectrum and good absorbance in the N.I.R. region of the spectrum, it is desirable to have a ($T_2-T_1$) of at least 25.

Many metal phthalocyanines are well known as blue to blue-green dyes and pigments. However, as protective agents for the present purposes, all those commonly used as dyes and pigments have too low an N.I.R. attenuation efficiency, i.e., below the desirable 25. For example, when incorporated into a poly(methylmethacrylate) substrate, copper phthalocyanine blue and copper phthalocyanine green have a ($T_2-T_1$) of 18 and 10, respectively. Accordingly, it was generally believed that metal phthalocyanines as a class would prove of little utility as N.I.R. protective agents.

Surprisingly in view of such previous lack of success, compound of Formula I when incorporated into transparent plastic materials, provide good N.I.R. absorption with good transmittance in the visual blue or blue-green portion of the spectrum; i.e., at wavelengths between about 450 and 550 millimicrons. Peaks of visual transmittance for the germanium and vanadium compounds are 484 and 523 millimicrons, respectively. In the same poly (methylmethacrylate) they have a ($T_2-T_1$) of 55 and 40, respectively, far above the required minimum. They are very stable to light in organic plastic substrates.

Both phthalocyanines of (I) are known compounds. Dihydroxy-germanium phthalocyanine is described by Joyner et al.; J. Amer. Chem. Soc. 82, 5790 (1960). Vanadyl phthalocyanine is described by Davis et al. in United States Patent 2,155,038.

In use, the metal phthalocyanines of the present invention may be incorporated in any suitable plastic or applied on suitable transparent substrates of plastic or glass. This is done by any of several known procedures, including for example; solution casting or dipping; hot milling; burnishing; or by dyeing. Organic plastic material containing these phthalocyanines can be molded into formed articles such as sheets and plates.

In any method of use, the salts may be incorporated as a barrier layer in or near one surface of a substrate or by disseminated therethrough. Choice of either practice depends on the type of protection used and the physical method used to combine the substrate and the salt or salts.

Either practice can be used to protect the treated material. Either can also be used to form a protective barrier between an object to be protected and the source of the infrared radiation. In the latter case, protection is usually provided by combining salt and organic substrate in a relatively thin layer or sheet which is then used as the protective barrier. Protection of an object also can be obtained by coating the salts, in a suitable vehicle, directly onto substrates such as glass or formed plastic objects whether to protect the substrate or in forming a protective barrier for other objects.

It is not readily possible to assign limits to the amount which it is desirable to use. In general, the limiting maximum is only an economic one. As to the minimum, it depends on whether the salt is disseminated uniformly through the substrate or is concentrated in a barrier layer of the same or a different substrate. When disseminated through a substrate, usually to protect the latter, there should be provided at least about 0.005 weight percent of the substrate. When concentrated in a barrier layer this is equivalent to about 0.01 gram per square foot of surface of a substrate about one-eighth inch in thickness.

The invention will be further illustrated in conjunction with the following specific examples which are intended for that purpose only. Therein, unles otherwise noted, all parts and percentages are by weight and all temperatures are expressed in degrees centigrade.

*Example 1*

Poly(methylmethacrylate) panels were prepared in which the metal phthalocyanines of Formula I were uniformly dispersed therethrough. To 100 parts of semi-molten plastic on a 2-roll mill heated at about 170° C., is added 0.1 part of the phthalocyanine. Mixing is accomplished by continuously stripping off and passing the plastic mass between the rolls for about 40 passes. Resulting plastic mass is then compression molded into smooth, transparent plates. From each plastic mass panels of different thickness were made as shown in Table III.

TABLE III

| Phthalocyanine | Panel | Thickness (mils) |
|---|---|---|
| Dihydroxygermanium | A | 12 |
| Do | B | 65 |
| Vanadyl | C | 17 |
| Do | D | 57 |

*Example 2*

Using a recording spectrophotometer, spectral data are taken on the test panels prepared in Example 1. In Table IV is shown for text panels A and C the wavelength of peak visual transmittance ($\lambda$); the percent transmittance at the peak visual transmission ($T_2$); the wavelength of maximum N.I.R. attenuation ($\lambda_{max}$); the percent transmission at the wavelength of maximum N.I.R. attenuation ($T_1$); and the N.I.R. attenuation efficiencies ($T_2-T_1$).

TABLE IV

| Panel | $\lambda$ (m$\mu$) | $T_2$ (percent) | $\lambda_{max}$ (m$\mu$) | $T_1$ (percent) | ($T_2-T_1$) |
|---|---|---|---|---|---|
| A | 484 | 73 | 900 | 18 | 55 |
| C | 523 | 47 | 840 | 7 | 40 |

In Table V is shown the percent transmittance for test panels B and D at 50 m$\mu$ intervals of the spectrum between 400 and 1000 m$\mu$; the wavelength of peak visual transmittance (VS$\lambda$) and the percent transmittance (T) at peak visual transmittance.

TABLE V

| Wavelength (m$\mu$) | IB (% T) | IID (% T) |
|---|---|---|
| 400 | 0 | 0 |
| 450 | 11 | 0 |
| 500 | 25 | 6 |
| 550 | 4 | 7 |
| 600 | 0 | 0 |
| 650 | 0 | 0 |
| 700 | 0 | 0 |
| 750 | 0 | 0 |
| 800 | 1 | 0 |
| 850 | 0 | 0 |
| 900 | 0 | 0 |
| 950 | 5 | 0 |
| 1000 | 29 | 0 |
| $\lambda$ (m$\mu$) | 484 | 523 |
| T (percent) | 28 | 9 |

*Example 3*

Light stability measurements are made by exposing test panels of Example 1 in a fadeometer and determining at intervals the percent absorbance remaining at the wavelength of maximum N.I.R. absorbance ($\lambda_{max}$). Illustrative results from panel A are shown in Table VI.

TABLE VI

Fadeometer hours: Percent N.I.R. Absorbance remaining
- 95 — 92
- 200 — 91.5
- 500 — 88
- 700 — 89
- $\lambda_{max}$ (m$\mu$) — 900

*Example 4*

For purposes of comparison, the procedures of Examples 1 and 2 are repeated forming test panels E, F, G and H of the same substrate containing the same concentration (about 0.1 weight percent) respectively of dihenoxygermanium phthalocyanine, chloroferric phthalocyanine, copper phthalocyanine green and copper phthalocyanine blue. All are metal phthalocyanines commonly used to produce blue to blue-green shades and have good optical properties in the visual range. The data of Table IV (above) is repeated in the following Table VII, together with comparable values for added test panels E, F, G and H.

TABLE VII

| Panel | Thickness (mils) | $\lambda$ (m$\mu$) | $T_2$ (Percent) | $\lambda_{max}$ | $T_1$ (Percent) | ($T_2-T_1$) |
|---|---|---|---|---|---|---|
| A | 12 | 484 | 73 | 900 | 18 | 55 |
| C | 17 | 523 | 47 | 840 | 7 | 40 |
| E | 12 | 537 | 72 | *900 | 51 | 21 |
| F | 17 | 566 | 31 | 870 | 9 | 22 |
| G | 15 | 545 | 71 | *900 | 61 | 10 |
| H | 16 | 505 | 68 | *900 | 50 | 18 |

*At $\lambda_{max}$ for panel A for comparison.

These comparative results illustrate the unique property of the compounds of Formula I in that they have a high N.I.R. attenuation efficiency, far above the desired minimum. The others, typical of all other metal phthalocyanines tested, all fall below the twenty-five mark.

We claim:
1. A composition of matter consisting essentially of poly(methylmethacrylate), which per se is substantially transparent in the visible spectrum, having incorporated therein from 0.01 gram to about 0.184 gram per square foot of a phthalocyanine of the formula:

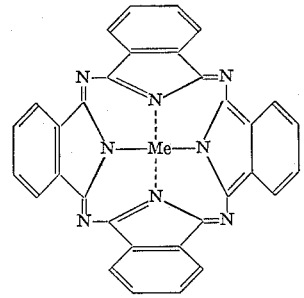

wherein Me is selected from the group consisting of Ge(OH)$_2$ and VO; and where Me is Ge(OH)$_2$ the percent transmittance at a wavelength of about 0.484$\mu$ is at least 25 above the percent transmittance at about 0.900$\mu$; and where Me is VO, the percent transmittance at a wavelength of about 0.523$\mu$ is at least 25 above the percent transmittance at 0.840$\mu$.

2. A composition of matter consisting essentially of poly(methylmethacrylate) which per se is substantially transparent in the visible spectrum, having incorporated on at least one surface thereof from 0.01 gram to about 0.184 gram per square foot of a phthalocyanine of the formula:

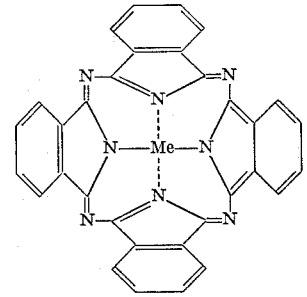

wherein Me is selected from the group consisting of GE(OH)$_2$ and VO; and where Me is GE(OH)$_2$ the percent transmittance at a wavelength of about 0.484$\mu$ is at least 25 above the percent transmittance at about 0.900$\mu$; and where Me is VO, the percent transmittance at a wavelength of about $0.523\mu$ is at least 25 above the percent transmittance at $0.840\mu$.

References Cited by the Examiner

UNITED STATES PATENTS

| | | | |
|---|---|---|---|
| 2,155,038 | 4/1939 | Davies et al. | 260—314.5 |
| 2,546,724 | 3/1951 | Coe | 252—300 |
| 2,643,982 | 6/1953 | Riley | 252—300 |
| 2,825,656 | 3/1958 | Walker et al. | 260—45.75 XR |

OTHER REFERENCES

Joyner et al.: Germanium Phthalocyamines, J.A.C.S. 82, pp. 5790 and 5791 (1960). Sci. Lib. QD 1 A5.

LEON D. ROSDOL, *Primary Examiner.*

JULIUS GREENWALD, ALBERT T. MEYERS,
*Examiners.*

R. D. LOVERING, *Assistant Examiner.*